Oct. 15, 1957 J. H. WILSON 2,809,530
REVERSING MECHANISMS
Filed June 3, 1953 4 Sheets-Sheet 2
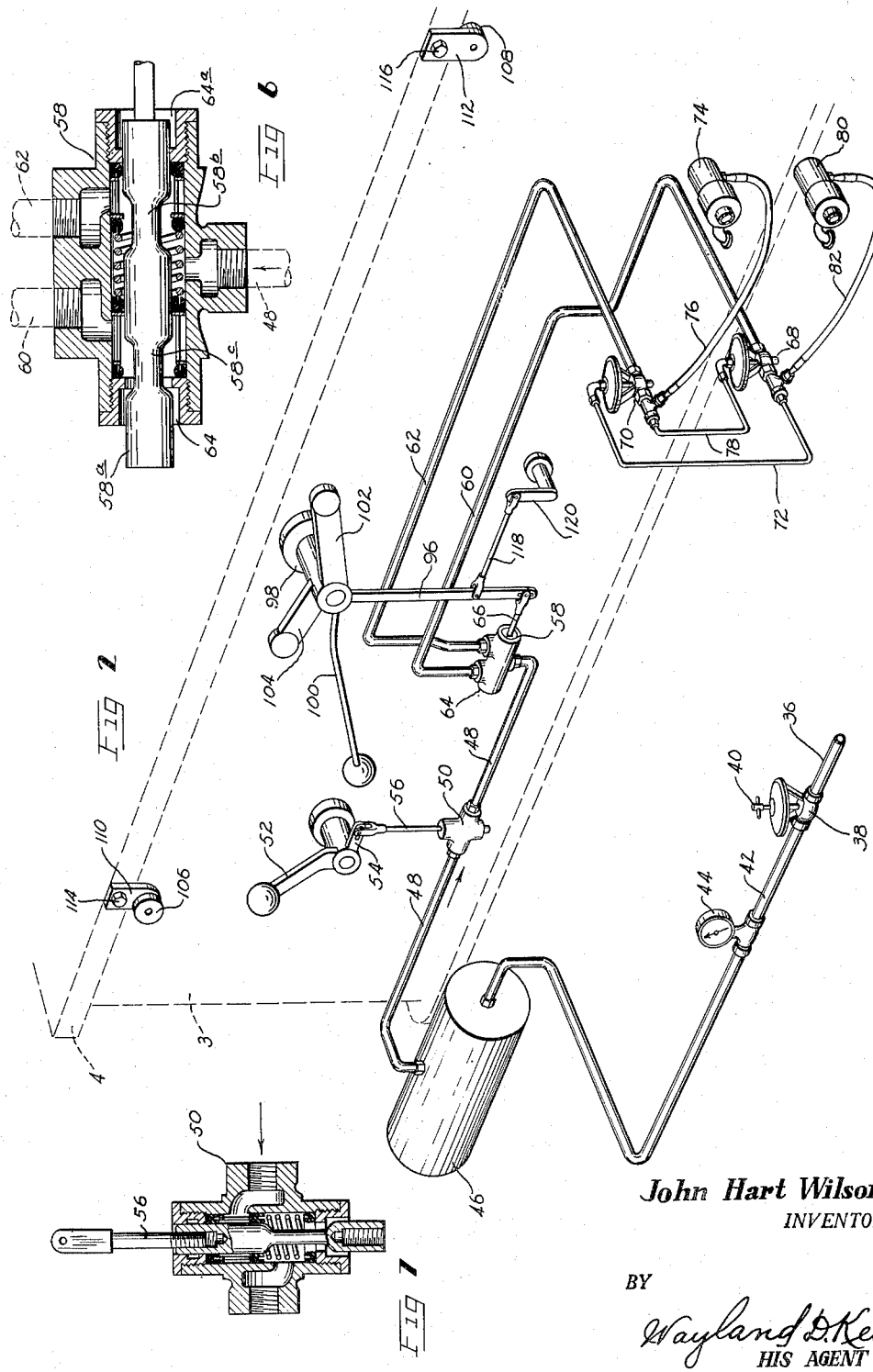
John Hart Wilson
INVENTOR.
BY
Wayland D. Keith
HIS AGENT Oct. 15, 1957  J. H. WILSON  2,809,530
REVERSING MECHANISMS
Filed June 3, 1953  4 Sheets-Sheet 3
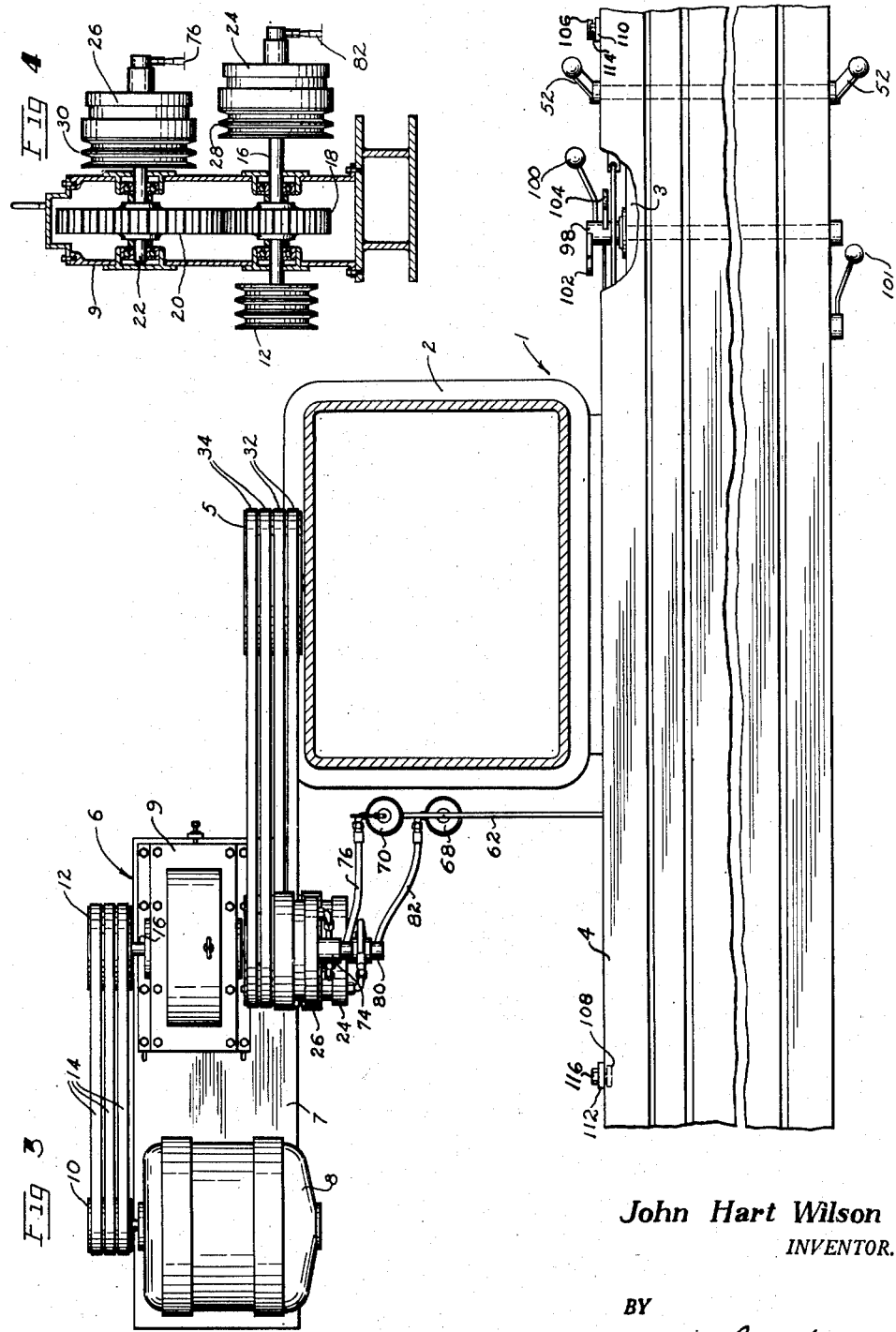
John Hart Wilson
INVENTOR.
BY
Wayland D. Keith
HIS AGENT

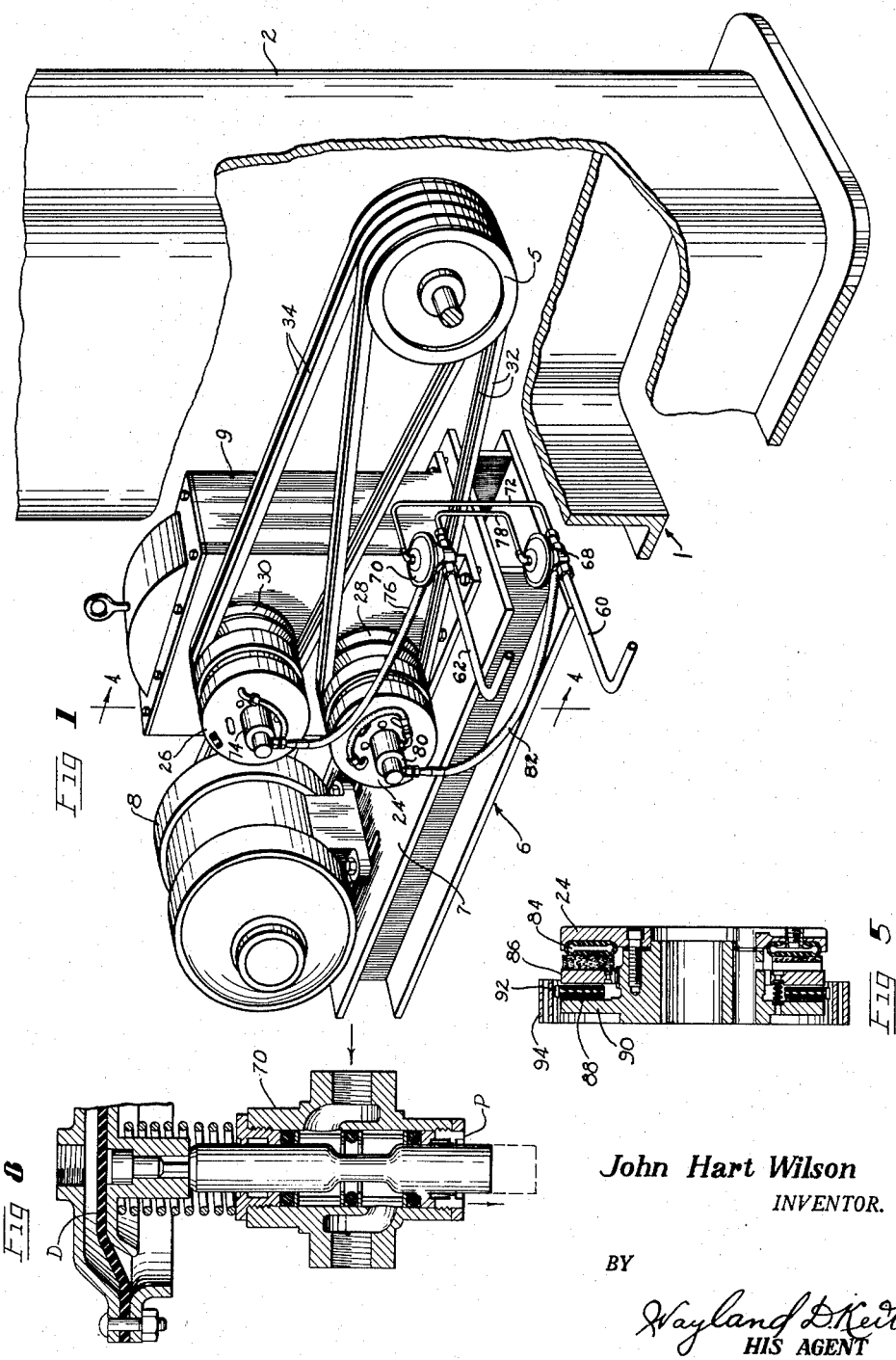

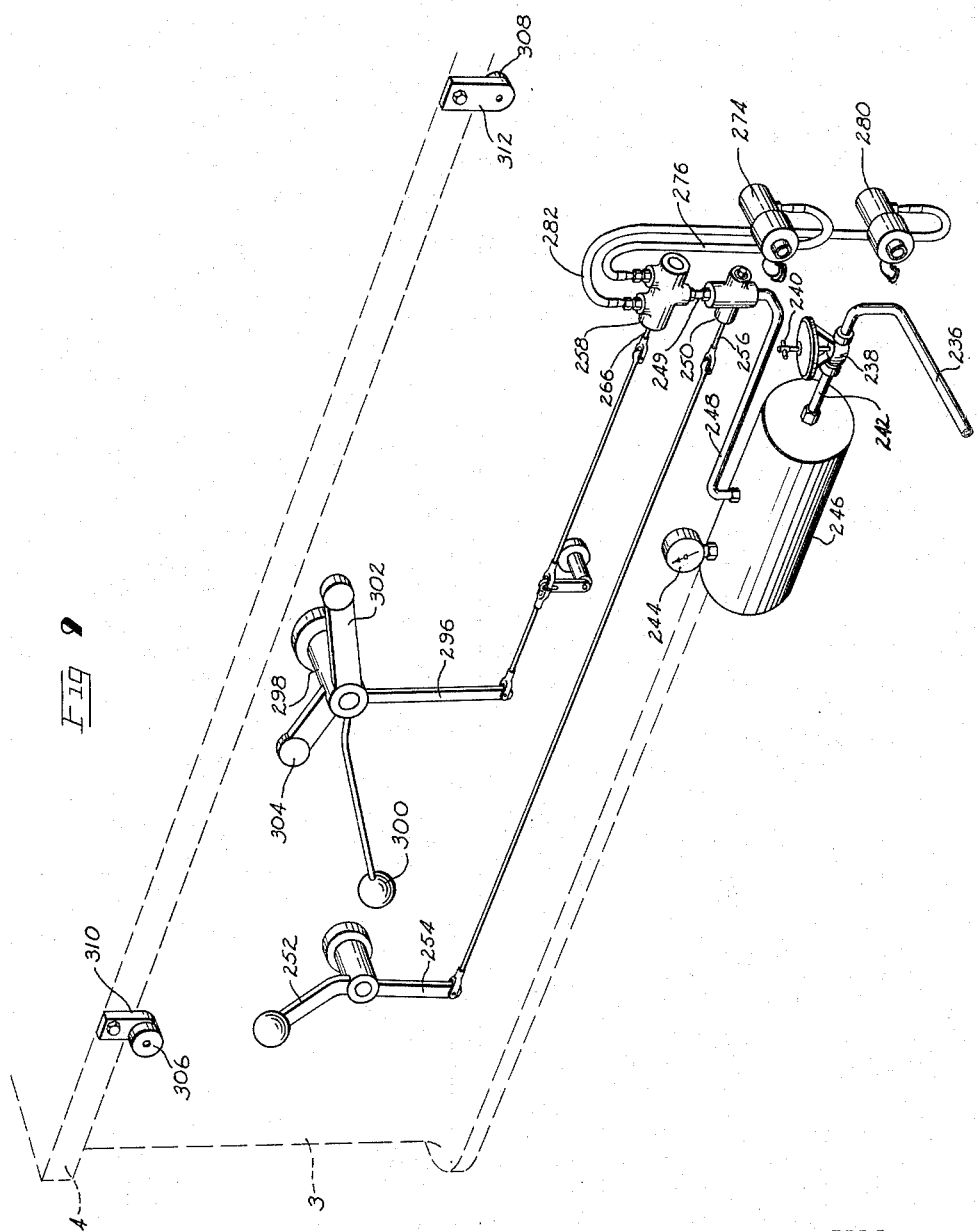

United States Patent Office 2,809,530
Patented Oct. 15, 1957

2,809,530

REVERSING MECHANISMS

John Hart Wilson, Wichita Falls, Tex.

Application June 3, 1953, Serial No. 359,336

10 Claims. (Cl. 74—220)

This invention relates to improvements in reversing mechanisms for rotating members, and more particularly to fluid actuated mechanisms for reversing planers and other types of mechanisms that utilize alternate reversal of rotation of a driven shaft.

Various reversing mechanisms have been proposed heretofore, both of the straight and crossed belt type and of the clutch type, however, these, when used where there is high inertia or heavy shock, do not withstand the constant strain of use without rapid wear.

The present invention employs a motor driving a pair of shafts in a gear mechanism in which a gear is mounted on each shaft, which gears are in mesh at all times, and each gear is secured to its respective shaft. The outer end of each shaft has a fluid tube, disc type clutch attached thereto, which clutch is arranged to engage and disengage in alternate relation so as to drive the pulley on a planer or the like in alternate directions either at the same speed, or at a faster speed in one direction than in the other direction, depending on the gear ratio of the gears running in mesh.

An object of this invention is to provide a mechanism for reversing the direction of rotation of a driven element, such as a planer or the like, in a very short interval of time but without shock to the machine.

Another object of this invention is to provide a clutch for a reversing mechanism that has constant torque and does not require adjustment to compensate for wear.

Another object of this invention is to provide a reversing mechanism for reversing a rotating driven element that utilizes a pair of air tube clutches.

Another object of this invention is to provide a reversing mechanism, the starting and stopping of which is air cushioned to alleviate excessive shock.

A still further object of this invention is to provide a fluid actuated clutch mechanism for reversing planers and the like that are driven in one direction at one speed, and at a different speed in the opposite direction.

Yet another object of the invention is to provide an air controlled reversing mechanism for a planer, wherein the planer may be readily reversed at any point in its travel.

Still another object of this invention is to provide an air control system for planers and the like wherein the planer may be moved any desired distance and an air valve actuated to either stop the planer or to reverse the travel thereof at any point in the length of the travel thereof.

An embodiment of this invention, together with a modification thereof, are illustrated in the accompanying drawings in which like reference characters designate like parts in the several views thereof, in which:

Fig. 1 is a fragmentary, perspective view of one form of the device, with parts broken away and shown in section, showing a portion of a planer, and showing the power drive mechanism and the air conduits leading to the air control clutches;

Fig. 2 is a fragmentary perspective view showing a portion of the planer in dashed outline, and showing the air control piping system and valves in full outline, and showing the reversing cam elements attached to the side of the planer bed;

Fig. 3 is a fragmentary top plan view of the planer showing the reversing mechanism in place and connected thereto in driving relation and showing the control valve for actuating the air system and showing the cams in place on the bed of the planer for controlling the length of the planer stroke and for reversing the direction of movement of the planer bed;

Fig. 4 is a sectional view taken substantially on the line 4—4 of Fig. 1, looking in the direction indicated by the arrows;

Fig. 5 is a longitudinal sectional view through one of the air tube clutches removed from the reversing mechanism;

Fig. 6 is a longitudinal sectional view through the reversing valve;

Fig. 7 is a longitudinal view through the control valve;

Fig. 8 is a fragmentary sectional view through a diaphragm control valve; and

Fig. 9 is a fragmentary perspective view of a portion of a planer, showing the modified form of the air control system for directing the air to the air clutches for actuating the reversing mechanism.

With more detailed reference to the drawings the numeral 1 designates generally a planer which has an upright column 2 that forms a housing for the gearing and other mechanism of the conventional planer. The numeral 3 designates a planer table base which has a reciprocatable table 4 mounted thereon. The table 4 is reciprocated in the conventional manner, as by a gear and rack, as is well understood in the planer art. The planer has a drive pulley 5 mounted on column 2 for driving the same in the conventional manner. The pulley 5 is preferably a multi-groove V-belt pulley, as will best be seen in Figs. 1 and 3. The power drive mechanism and the reversing mechanism is generally designated at 6 and has a mounting frame 7 that forms a base for motor 8 and reverse gear assembly housing 9.

The motor 8 has a V-belt pulley 10 thereon for driving pulley 12 mounted on gear assembly housing 9. V-belts 14 are mounted on pulleys 10 and 12 so as to drive shaft 16 which is journaled on bearings within the gear assembly housing 9. The shaft 16 has a gear 18 mounted thereon and secured thereto which runs in mesh with gear 20, which is preferably of larger diameter than the gear 18, which gear 20 is mounted on and secured to shaft 22. The shaft 22 is journaled on bearings within housing 9, as will best be seen in Fig. 4. Shaft 16 has a clutch 24 mounted on the opposite end from V-belt pulley 10 and shaft 22 has a clutch 26 mounted directly above clutch 24 but which is off-set longitudinally with respect thereto. Clutch 24 has a V-belt pulley 28 mounted thereon and clutchingly driven thereby. Clutch 26 has a V-belt pulley 30 mounted thereon and clutchingly driven thereby, however, the V-belt pulley 30 is off-set longitudinally with respect to V-belt pulley 28 so the grooves of V-belt pulley 28 will align with certain grooves on V-belt pulley 5, and the grooves of V-belt pulley 30 will align with certain other V-belt grooves on V-belt pulley 5.

V-belts 32 are positioned around V-belt pulley 28 and V-belt pulley 5 in driving relation and V-belts 34 are positioned around V-belt pulley 30 and V-belt pulley 5 in driving relation, as will best be seen in Fig. 1.

The motor 8, as well as the housing 9, is bolted to the mounting plate 7 and each of these members is adjustable longitudinally of the mounting plate 7, to enable the tightening of belts 14, 32 and 34 to give the proper driving relation between the respective V-belt pulleys around which the respective belts are positioned.

An air supply pipe 36 provides air to high pressure diaphragm regulated valve 38, which valve has a screw 40 by which the air pressure may be regulated or reduced into pipe 42. A gauge 44 is provided within pipe 42 so as to enable the screw 40 to be set to give the proper pressure to be applied to the respective clutches 24 and 26.

The pipe 42 connects with reservoir or surge tank 46 that serves as a storage or reserve supply of air at low pressure so there will be no fluctuation of operating pressure for the clutches 24 and 26 respectively. A pipe 48 leads to and through an "on, off and bleed" valve 50 which is manually controlled by levers 52 positioned on each side of the base 3 and mounted on a shaft that passes through and is journaled within base 3. A lug 54 is positioned on one of the levers 52 and connects with a valve stem 56 for controlling the valve 50. The pipe 48 leads from valve 50, as shown in Figs. 1 and 7, into a four-way valve 58. The four-way valve 58, when in one position, will direct air from pipe 48 into pipe 60 and exhaust air from pipe 62 out through an opening 64a in valve 58.

When the valve plunger 58a is moved into an alternate position as shown in Fig. 6, the air will be directed into pipe 62 and the air within pipe 60 will exhaust out through passage 64. The pipes 60 and 62 connect with pressure actuated, normally open, three-way valves 68 and 70, respectively, and when pressure is applied to pipe 60, and with valves 68 normally open, the pressure will pass through pipe 72 to apply pressure to the diaphragm of valve 70, whereupon valve 70 will be held in closed position with respect to pipe 62 but will have an exhaust port P open to hose 76 to permit the air exhausting from clutch 26 to escape outward through rotary fluid seal 74, hose 76, and through an exhaust port P in valve 70.

Upon reversal of the position of valve 58, air will be directed from pipe 48 through valve 58 into pipe 62 and through valve 70, which is now open, pressure will be applied through pipe 78 to the diaphragm of the pressure actuated valve 68 so as to close the valve and open an exhaust port to exhaust air from clutch 24 through rotary seal 80, hose 82 and valve 68 to exhaust out through the open exhaust port in valve 68.

It is to be pointed out that each time the air in four-way valve 58 is directed through pipe 60 or pipe 62 to the respective clutches 24 and 26, the opposite line is opened to atmosphere to exhaust the air therefrom. By inspection of Fig. 6, it will be noted that when air is being directed from pipe 48 by the plunger 58a and out through pipe 62, that the air exhausted through pipe 60 will pass outward by the reduced portion of plunger 58a and out through the open end 64 of valve 58. When the valve plunger 58a moves into an alternate position to the opposite end, an alternate cycle takes place, that is, the air is directed from pipe 48 by the reduced portion of plunger 58a into pipe 60 and the air exhausting from pipe 62 will pass into valve 58 and outward by the reduced portion of the plunger 58a to exhaust through the open end 64 of valve 58.

It is to be pointed out that the cycle of action of reversing the device is so rapid that the air must be exhausted from the clutch and from the system and new air admitted under pressure to perform the reversing operation in a minute interval, therefore, in a system where the valve 58 is located at a remote point from the clutches, the air must be exhausted both from the pipes and the clutches separately to enable the proper functioning of the clutches.

The clutch 24 is shown in detail in Fig. 5, and has an axially expansible air tube 84 therein that moves clutch plate 86 into binding engagement with friction element 88 to bind the friction element 88 between clutch plate 86 and back-up plate 90. The teeth 92 on friction element 88 inter-engage with teeth formed on the inner periphery of annular member 94 so as to drive a V-belt pulley 28 attached thereto. The clutch plate 86 has teeth on the inner periphery thereof which inter-engage with teeth on the hub of the clutch 24, which enables the tube 80 to remain non-rotatable with respect to clutch plate 86, and the hub portion of the clutch.

A valve stem 66 pivotally connects with a lever 96 that is attached to the hub 98, to which a manual reversing lever 100 is attached. The hub 98 is mounted on a shaft on the base of the planer and has a manually controlled reversing lever 101 on the opposite side of the base that is connected to lever 96 by linkage 118 and lever 120.

Cam actuated reversing levers 102 and 104 are attached to hub 98 and are spaced apart longitudinally so as to engage cam rollers 106 and 108, respectively. The levers 102 and 104 are spaced apart longitudinally to occupy separate planes so that the rollers 106 and 108 will only engage the respective cam levers 102 and 104 to actuate the valve stem 66. The cam rollers 106 and 108 are attached to movable brackets 110 and 112 respectively, which brackets are adjustably secured in binding relation to the edge of the planer table 4 by means of cap screws 114 and 116, respectively. It is preferable to have the roller 106 to extend outwardly and the roller 108 to extend inwardly so that they will contact their respective cam levers only.

Operation

With air pressure within line 36 at or above the desired pressure to regulate the system, the pressure reducer to regulator 38 is adjusted to the proper setting by controller screw 40. Whereupon, the air is delivered into line 42 and into storage or surge tank 46 at the desired pressure. The pressure may be regulated until gauge 44 gives the correct operating pressure, whereupon, normally closed valve 50 is opened, which will direct air at the desired pressure, usually about 25 lbs., from tank 46 into pipe 48 and into valve 58. The valve 58 is a four-way piston type slide valve of conventional structure, and when in the position as shown in Fig. 6, will direct air therethrough and through the reduced portion 58b of the plunger 58a, into pipe 62. The air will pass through pipe 62 through normally open valve 70 and into rotary fluid seal 74 and into clutch 26, which will cause axial expansion of clutch tube 84 to cause gripping action of clutch plate 92 between clutch plate 86 and back-up plate 90, and since the clutch 26 is secured to shaft 22, as by keying, the pulley 30 attached thereto will be caused to rotate, and with the pulley 12 being driven by motor 8, the small gear 18 will transmit power to gear 20 and cause gear 20 to drive through V-belt pulley 30 to drive V-belt pulley 5 in a lower geared relation to drive the planer bed 4, with the planer bed 4 being driven in this gear throughout the cutting stroke of the planer. However when the planer has moved throughout the length of the cutting stroke, the roller 108 will engage lever 104 which will move the valve plunger 58a to the right, as viewed in Figs. 2 and 6, which will cause the air to be exhausted from line 62 and out through opening 64a. The air will then be directed through valve 58 and by reduced portion 58c and into pipe 60, whereupon the air will be directed into and through valve 68 and simultaneously into hose 82 and pipe 72, which air pressure will cause the diaphragm D of valve 70 to move the valve 70 into closed position with respect to line 62 and at the same time opening port P in the lower end of the valve 70. Upon the opening of the port P, the air in clutch tube of clutch 26 will be exhausted out through hose 76 to atmosphere.

The air that is directed into hose 82 and rotary fluid seal 80 into clutch 24 will cause a clutching action of clutch 24. Then, upon engagement of clutch 24, the motor 8 will drive through pulleys 10 and 12 and through clutch 24, which is running at the same speed as the pulley 12, which will drive through belts 32 to pulley 5, which will cause the planer pulley 5 to drive the planer table 4 at a faster speed, than when driven through the clutch 26, so as to give a quick return of the planer table 4.

As soon as the planer has completed its travel, roller 106 will engage cam lever 102 to move the valve 58 into position as shown in Fig. 6. The air will be exhausted through opening 64 of valve 58 and be directed into pipe 62 to repeat the cycle as above set out.

The brackets 110 and 112 may be adjustably positioned along the length of planer bed so as to give the desired stroke of the planer bed. It is to be pointed out that the less air that is carried in the system, the slower the clutch will engage and the more cushioning will be provided against the impact of the stopping and reversing of the planer bed. However, by increasing the pressure, by means of regulator screw 40, the clutches will engage more quickly and will therefore stop the planer bed more quickly with a minimum of over-run after the valve 58 has shifted the air to the opposite lines. In instances where excessive weight is carried by the table, so as to present high inertia, it is necessary to carry a higher pressure in the system than where lighter objects are carried by the planer bed to be operated on by the planer.

While the gear 20 is shown to be larger than the gear 18, it is to be understood that the gearing can be made equal in ratio or of inverse ratio, as the particular situation of operation demands.

Modified form of invention

An alternate form of air supply system is shown in Fig. 9, wherein a fluid supply line 236 supplies air at high pressure to a pressure regulator valve 238 having a manual adjustment screw 240 to regulate the pressure into pipe 242 or to reduce the pressure thereinto. A reservoir or surge tank 246 is provided which has a gauge 244 thereon to determine the setting of the regulator or pressure reducer 238. A pipe 248 leads from reservoir 246 to and through valve 250. The valve 250 is of the character shown in Fig. 7, that is, "on, off and bleed" type.

A lever 252 has a lever 254 extending outward therefrom and connects with stem 256 to actuate valve 250.

A pipe 249 connects with the inlet side of valve 258 which is provided with a valve actuating stem 266, and hoses 282 and 276 lead from the valve 258 and connect directly with the respective rotary fluid seals 280 and 274, which rotary seals connect to fluid actuated clutches, such as 26 and 24, respectively, as shown in Fig. 1.

The power reversing gear mechanism, generally designated at 6, is the same with this form of the device as for the form described above. A lever 296 is mounted on hub 298, which hub carries a manually operated lever 300 and cam levers 302 and 304. Rollers 306 and 308 are attached to brackets 310 and 312 respectively. The brackets 310 and 312 are secured to the side of the planer bed 4 by means of bolts, in such manner that they may be adjusted along the length thereof so that the rollers 306 and 308 will engage the respective cam levers 302 and 304 upon reciprocation of planer table 4.

Operation

Valve 238 is similar in construction to valve 38 in the form of invention above described, respectively, and valves 250 and 258 are similar in construction to valve 50 and valve 58, as are shown in Figs. 7 and 6, respectively.

In this form of the invention, valves 250 and 258 are mounted in close proximity to the respective clutches on which rotary seals 274 and 280 are mounted.

Upon air passing through valve 258 and hose 276 into rotary seal 274, the air is exhausted from clutch 24 into rotary seal 280 and through hose 282 to exhaust out through exhaust port of valve 258. Then upon shifting of the plunger of the valve 258, the air will be directed into the opposite clutch 24 through hose 282 and the air is exhausted from clutch 26 through hose 276 and out through exhaust port in the right hand end, as shown in Fig. 9, of the valve 258.

It will be seen that with the above described arrangement, valves 250 and 258 may be placed in close proximity to the respective clutches, thereby performing the reversing operation with the exhausting of a minimum amount of air.

Having thus described the invention, what is claimed is:

1. A device for reversing the driven mechanism of a machine having a reciprocating element, which reversing device comprises a base, a pair of shafts journaled on said base, each of said shafts having a gear fixed thereon, which gears are in mesh, means for driving one of said shafts, a pneumatically actuated clutch on each of said shafts, gearing means connected with each of said clutches in clutching relation, valve means for directing air under pressure to said clutches, fluid actuated valve means for releasing air from said clutches, and cam means for alternately actuating said first mentioned valve means upon reciprocation of said reciprocating element for simultaneously engaging one of said clutches and disengaging the other of said clutches.

2. A device for reversing the driven mechanism of a machine having a reciprocating element, which reversing device comprises a housing, a pair of shafts journaled in said housing, each of said shafts having a gear fixed thereon, which gears are in mesh, means for driving one of said shafts, a pneumatically actuated clutch on each of said shafts, gearing means connected with each of said clutches in clutching relation, valve means for directing air under pressure to said clutches, fluid actuated valve means for releasing air from said clutches, and cam means for alternately actuating said first mentioned valve means upon reciprocation of said reciprocating element for simultaneously engaging one of said clutches and disengaging the other of said clutches.

3. A device for reversing a driven mechanism of a machine having a reciprocating element, which reversing device comprises a base, a housing mounted on said base, a pair of shafts passing through and journaled in said housing, each of said shafts having a gear fixed thereon within said housing, which gears are in mesh, means for driving one of said shafts, a pneumatically actuated clutch on each of said shafts, a pulley mounted on each of said clutches and driven thereby when the respective clutches are in engagement, valve means for directing air under pressure alternately to said clutches, air actuated diaphragm valve means between said first mentioned valve means and said clutches for releasing air alternately from said clutches, and means for alternately actuating said first mentioned valve means upon reciprocation of said reciprocating element for simultaneously engaging one of said clutches and disengaging the other of said clutches.

4. A device for reversing a driven mechanism of a machine having a reciprocating element, which reversing device comprises a gear housing mounted in driving relation with respect to said machine, a pair of shafts journaled in said housing, each of said shafts having a gear fixed thereon which gears are of different diameters and in mesh, means for driving one of said shafts, a pneumatically actuated clutch on each of said shafts, a V-belt pulley mounted on each of said clutches and connected therewith in clutching relation, each of said pulleys having a V-belt thereon and connected in driving relation with a driven V-belt pulley on said machine, the respective V-belt pulleys on said clutches being spaced apart longitudinally so the respective grooves therein will align with grooves in said driven pulley, each of said pulleys on said clutches and said driven V-belt pulley on said machine being adapted to be driven in unison, a valve system including a mechanically operated valve and a diaphragm operated valve for directing air under pressure to one of said clutches for engagement thereof, and a further valve system including said first mentioned mechanically operated valve and a second diaphragm operated valve for releasing air from the other of said clutches for simultaneously disengaging said clutch, and means attached to said machine for actuating said mechanically operated valve for alternately engaging and disengaging said clutches.

5. A device for reversing the driven mechanism of planers and the like, comprising a base, a gear housing mounted on said base, a pair of shafts journaled in said housing, each of said shafts having a gear fixed thereon, which gears are of different diameters and in mesh, means for driving one of said shafts, a pneumatically actuated clutch on each of said shafts, a V-belt pulley mounted on each of said clutches and connected therewith in clutching relation, each of said pulleys having a V-belt thereon and connected in driving relation with a driven pulley on said planer, each of said pulleys on said clutches and said driven pulley on said planer being adapted to be driven in unison at all times, valve means for directing air under pressure alternately to said clutches, air actuated diaphragm valve means between said first mentioned valve means clutches for releasing air alternately from said clutches, and means driven by said planer for alternately actuating said first mentioned valve means for simultaneously engaging one of said clutches and disengaging the other of said clutches.

6. In a device for reciprocally driving and reversing the direction of movement of the driven mechanism of planers and the like, a base, a gear housing mounted on said base, a pair of shafts passing through and journaled in said housing, each of said shafts having a gear fixed thereto within said housing, which gears are of unequal diameters and in mesh, means for driving one of said shafts, an axially expansible pneumatic clutch on each of said shafts, pulley means mounted on and connected with each of said clutches, valve means for directing air under pressure to one of said clutches for engagement thereof, and valve means actuated by air passing through said first valve means for simultaneously releasing the air from the other of said clutches for disengagement of said clutch.

7. In a device for reversing the driven mechanism of planers and the like, a gear housing mounted adjacent said planer, a pair of shafts passing through and journaled in said housing, each of said shafts having a gear fixed thereto within said housing, which gears are of unequal diameters and in mesh, means for driving one of said shafts, an axially expansible pneumatic clutch on each of said shafts, pulley means mounted on and connected with each of said clutches, valve means for directing air alternately under pressure to one of said clutches for engagement thereof, and further valve means actuated by pressure from said first mentioned valve means for simultaneously releasing the air alternately from the other of said clutches for disengagement of said clutch and means for alternating the air supply to and the release of air from said clutches.

8. A device for reversing the driven mechanism of a machine having a reciprocating element, which reversing device comprises a housing, a pair of shafts journaled in said housing, each of said shafts having a gear fixed thereon, which gears are in mesh, means for driving one of said shafts, an air actuated clutch on each of said shafts, transmission means connected with each of said clutches, valve means for directing air under pressure alternately to said clutches, air actuated diaphragm valve means between said first mentioned valve means and said clutches for releasing air alternately from said clutches, and means for alternately actuating said first mentioned valve means upon reciprocation of said reciprocating element for simultaneously engaging one of said clutches and disengaging the other of said clutches.

9. The reversing mechanism as set forth in claim 8, wherein said air actuated diaphragm valve means directs air to one of said clutches while releasing air from the other of said clutches.

10. In a device for reversing the mechanism of a reciprocating carriage or the like, a gear housing, a pair of shafts passing through and journaled in said gear housing, each of said shafts having a gear fixed thereto within said housing, which gears are in mesh, means for driving one of said shafts, a clutch on each of said shafts, each of said clutches having a pneumatically responsive element therein, a clutch element within each of said clutches for engaging the clutch in driving relation with said respective shafts, a pneumatic pressure supply conduit, a mechanically operated multi-port valve connected to said pneumatic supply conduit, a conduit leading from said multi-port valve to one of said clutches, a second conduit leading from said multi-port valve to the other of said clutches, a combination pressure actuated, diaphragm valve and release valve in each of said conduits leading from said multi-port valve to the respective clutches, each said combination valve being alternately operative to supply air to or exhaust it from its respective clutch, and means interconnecting each said conduit in controlling relation with the combination valve of the other said conduit to exhaust air from said clutch of the other conduit responsive to air pressure in either said conduit.

References Cited in the file of this patent
UNITED STATES PATENTS

| | | |
|---|---|---|
| 830,799 | Moreton | Sept. 11, 1906 |
| 1,007,957 | McCausland | Nov. 7, 1911 |
| 1,007,963 | Northrup | Nov. 7, 1911 |
| 1,895,480 | McCune | Jan. 31, 1933 |
| 2,542,351 | Pease | Feb. 20, 1951 |
| 2,648,359 | Barksdale | Aug. 11, 1953 |

FOREIGN PATENTS

| | | |
|---|---|---|
| 233,140 | Great Britain | May 7, 1925 |
| 227,843 | Switzerland | Oct. 1, 1943 |